Nov. 15, 1949  J. H. LLOYD, JR  2,488,212
METHOD OF SEALING THERMOPLASTIC MATERIAL
Filed Oct. 18, 1945
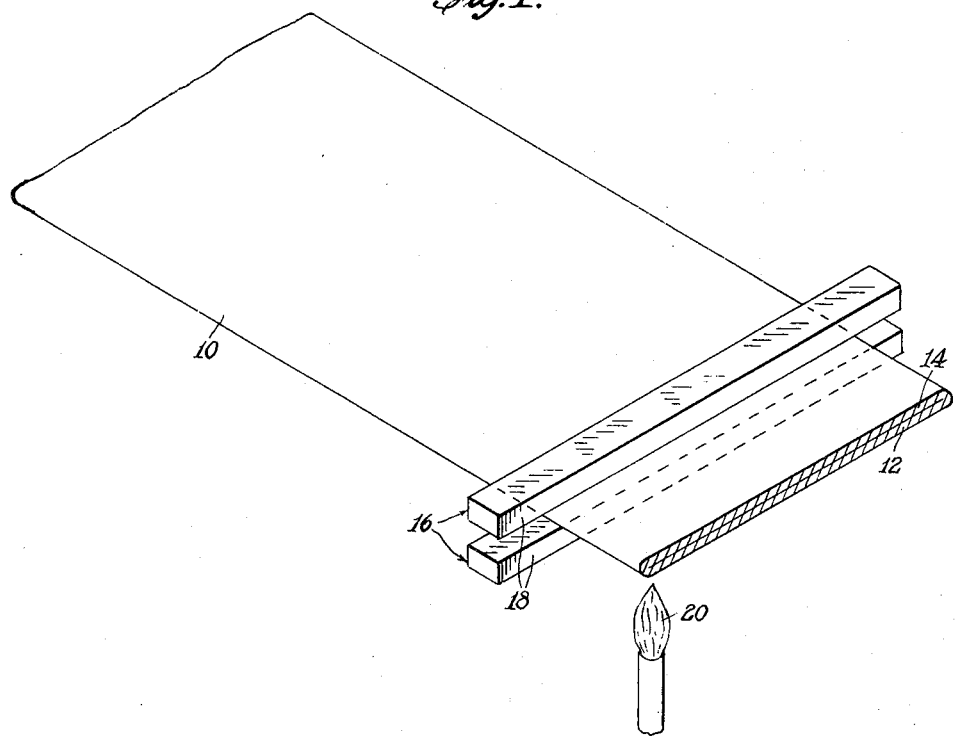
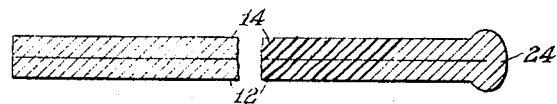
INVENTOR.
JAMES H. LLOYD, JR.
BY
Wm. S. Pritchard
ATTORNEY.

Patented Nov. 15, 1949

2,488,212

UNITED STATES PATENT OFFICE 2,488,212

METHOD OF SEALING THERMOPLASTIC MATERIAL

James H. Lloyd, Jr., Oak Park, Ill., assignor to The Visking Corporation, Chicago, Ill., a corporation of Virginia Application October 18, 1945, Serial No. 623,057

5 Claims. (Cl. 154—116)

This invention relates to containers, such as envelopes, bags, pouches and the like, formed of a thermoplastic substance and to the method of making the same. More particularly, it relates to a method of sealing one end of a flattened tubing formed of a thermoplastic substance and the end closure resulting therefrom.

United States Patent 2,153,553 discloses a solid polymer consisting of polyethylene. Such polyethylene is insoluble in many solvents, such as water, ethanol, amyl alcohol, ethyl ether, acetone, chloroform, and glycerin. It is also unaffected by contact with inorganic acids and alkalis, either in the cold or at temperatures of from 80° C. to 90° C.

Recently, there has been devised a process wherein polyethylene is extruded from a melt to form a thin-walled, seamless tubing which is collected in flattened condition on a reel. Because of the properties of polyethylene, the tubing is admirably suitable for use as a packaging material, such as containers, for example, envelopes, bags, pouches, etc. According to one procedure for making a container, the flattened tubing was cut into lengths of desired size and the end of the tubing which was to constitute the bottom of the container was heat sealed with hot metal bars and pressure. Polyethylene has a sharp melting point and a decided tendency to adhere to the sealing elements. Accordingly, in making such heat seal, a protective material such as glassine paper or regenerated cellulose was positioned intermediate each of the heat sealing elements and the polyethylene to prevent adhesion of the polyethylene to the heat sealing elements. In some cases where a stronger seal was desired, the faces of the heat sealing bars were designed to also crimp the heat sealed materials. The seal resulting from such heat sealing methods comprised a tab which was permitted to extend from the container or was overlapped onto the container.

An object of this invention is to provide a container, such as an envelope, bag, pouch and the like, formed of a thermoplastic composition and having a new and improved end closure or seal.

Another object of this invention is to provide containers, such as envelopes, bags, pouches, etc., formed of thermoplastic materials and having an attractive, rugged and strong end closure or seal.

A further object of this invention is to provide a new and improved method of forming an end closure or seal for containers, such as envelopes, bags, pouches, etc., formed of a thermoplastic material.

Other and additional objects will become apparent hereinafter.

The objects of the invention are accomplished, in general, by securing a tubing of predetermined size formed of a thermoplastic material in the flattened condition between a pair of juxtaposed strips so that the ends of both plies of the flattened tubing extend a predetermined distance forwardly of said strips, and passing such forwardly extending portions through a flame at such a speed that the forwardly extending portion of each of the plies passing through the flame will melt without combustion and without substantial carbonization. Upon fusion of the thermoplastic material, the molten material of both of the plies will coalesce. The strips between which the tubing is positioned serve as a barrier and confine the fusion of the thermoplastic material to the portions extending forwardly thereof. The free or exposed surface of the molten coalesced material assumes a curved contour which sets on leaving the zone of action of the flame to produce a substantially uniform bead which tenaciously secures the plies together, forming a strong and rugged end closure or seal. The length of the forwardly extending portions is such that the volume of the molten coalesced material resulting therefrom is sufficient to form a uniform bead.

The flattened tubing is tightly compressed between the strips and so maintained until the bead is formed. The strips are made of a material and of such dimensions that they will conduct away or dissipate heat at a relatively rapid rate.

The invention will be more clearly understood by reference to the following detailed description when taken in connection with the accompanying drawings, wherein:

Figure 1 is a perspective view illustrating diagrammatically the manner of carrying out the process; and Figure 2 is a longitudinal section of a container containing the bead seal.

Referring now to the drawings wherein like reference numerals designate like parts, the reference numeral 10 generally designates a thin-walled, seamless tubing formed of polyethylene and in the flattened state so that the wall thereof constitutes two superimposed plies 12 and 14. The flattened tubing 10 is positioned between a pair of opposed flat aluminum strips 16 so that the end of the tubing 10, which is to be sealed, projects forwardly of the strips 16. The strips 16 are disposed so that the front edges 18 thereof, which are straight, are parallel and in alignment with each other. In the form shown, both of the strips 16 are substantially of the same length and of a width to conduct the heat away rapidly. After the tubing has been positioned therebetween, the strips are moved toward each other so that the tubing therebetween will be securely and firmly gripped thereby. The length of the strips 16, as shown in Figure 1, is greater than the flat width of the flattened tubing gripped therebetween for reasons which will be apparent hereinafter.

After the tubing 10 has been positioned between the strips 16, as previously explained, a flame 20 is played upon the exposed edge of the portion of the tubing extending in front of the strips 16 for a period of time sufficient to melt the entire projecting portion without combustion or substantial carbonization. The projecting portion of each of the plies 12 and 14 is melted and the molten composition coalesces. The strips 16, and particularly the front edges 18 thereof, serve as a barrier and limit the fusion to the material projecting in front thereof. The exposed portion of the coalesced molten material assumes a curved contour which, upon removal from the zone of action of the flame, sets to form a substantially uniform bead 24, sealing the two plies 12 and 14 together and forming a strong, rugged, liquid-tight end closure. Upon removal from the zone of action of the flame 20, the strips 16 are loosened and the tubing 10 removed therefrom.

The bead seal 24, as shown in Figure 2, is substantially uniform throughout its length. It has a breaking strength that is substantially greater than that obtained by the prior art method of heat sealing. The seal is also liquid-tight. Tests have shown that a bead seal on an envelope or pouch made as above described will not leak when the envelope or pouch is filled with 5" of water.

As shown in Figure 2, the bottom and top of the bead seal 24 project equidistantly from the respective plies 12 and 14. In some cases, the bottom of the bead may extend from the bottom ply for a distance that is greater or less than the distance the top of the bead extends from the top ply. Generally, however, the exposed portion of the bead 24 is substantially uniformly curved.

The distance which the flattened tubing 10 extends beyond the front edges 18 of the strips 16 is important in obtaining the neat, strong, rugged seal 24. The length of the tubing exposed to the zone of action of the flame is such that the volume of molten material resulting therefrom will coalesce and quickly set to form a bead closure upon removal from the zone of action of the flame. Experiments have shown that, when this distance is between about $\frac{1}{16}$" and about $\frac{1}{8}$", satisfactory results are obtained. If the distance is greater than about $\frac{1}{8}$", there will result a flame-sealed edge which is scalloped, irregular, uneven in thickness, and apt to break and leak. For optimum results, the edge of the projecting end of the tubing should be straight and parallel to the front edges 18 of the confining strips 16, whereby the length of the projecting portion will be substantially uniform over the width of the tubing.

Though, as hereinbefore described, a pair of opposed aluminum strips 16 constitute the means for limiting the fusion to only the projecting portion of the tube, it is to be understood that the invention is not restricted to such specific means. In general, the means for confining the fusion to the predetermined end portion of the tubing can be formed of any material, such as metal, for example aluminum, steel, etc., and of such dimensions that they will confine the fusion to the material forwardly thereof and conduct heat away rapidly.

For the successful practice of the invention, both of the opposed means need not be identical in construction. The invention can be satisfactorily carried out if the front edges of the opposed confining means are disposed parallel and in alignment with each other, irrespective of the shape and design of the remaining portion of such means. In general, the front edges of the confining means are of such thickness that the coalesced material will be restrained from flowing thereover.

The application of the flame to the edge of the flattened tubing which is to constitute the seal can be obtained either by moving the flame relative to the flattened tubing or vice-versa. Though in the above embodiment of the invention the use of a single flame has been described, it is apparent that a plurality of flames arranged in series can be used. In the preferred embodiment of the invention, the flame is obtained by burning ordinary gas. Obviously, the flame can be obtained by burning other substances.

The rate of relative movement between the flame and the material depends on the temperature of the flame, the thickness of the plies, as well as the melting point of the thermoplastic constituting the flattened tubing. In general, the speed of relative movement between the material and the flame or flames is such that the material will be exposed to the zone of action of the flame for a period of time to quickly melt the thermoplastic without combustion or substantial carbonization.

The preferred embodiment of the invention, as has hereinbefore been described, relates to forming a bead closure at one end of a flattened seamless tubing of polyethylene. However, it is to be understood that the invention is not restricted to such tubing or tubing made of such thermoplastic material. In general, the invention is applicable to tubing made by any process whatsoever and irrespective of whether the tubing be of the seamless type or have one or more seams extending longitudinally thereof, provided that the material which constitutes such tubing is thermoplastic.

The tubing can be of the type wherein the sides are plicated (also known as pleated, bellowed, or infolded). When a flattened tubing with plicated sides is end-sealed by a bead obtained by the flame-sealing process hereindescribed, the bead at the ends of the plications will be formed of the coalesced material resulting from the fusion of the exposed ends of the plications and that portion of the front and back plies of the tubing in juxtaposed relationship with the plications. Consequently, the portions of the bead at the ends of the plications will be larger (thicker) than that portion of the bead which results from the coalescence of only the front and back plies of the tubing. Though the difference in thickness of bead can be observed upon examination of the bead closure, especially when the exposed end of the bead is viewed, nevertheless when the bead is viewed from the top or bottom thereof it appears substantially uniform. Due to the confining means employed in the process, the bead projects in a vertical direction from the respective top and bottom plies of the tubing. The extension of the bead from the top ply is substantially uniform throughout its length. Likewise, the extension of the bead from the bottom ply is also substantially uniform throughout its length and may be equal to or differ in size from the extension of the bead from the top ply.

The invention is also not restricted to tubing made of any specific thermoplastic material. The invention is particularly applicable to tubing made of thermoplastic materials having sharp melting points, but it can be satisfactorily utilized with tubing made of other thermoplastic materials. Tubings made of various thermoplastic materials, such as, for example, polyisobutylene, Pliofilm, ethyl cellulose, cellulose acetate, and copolymers of vinyl chloride and vinyl acetate have been provided with satisfactory bead seals by the method herein described.

The invention is particularly applicable to thin-walled tubing. Highly satisfactory results have been obtained when the wall thickness of the tubing was, for example, from 0.00005" to 0.005", though it is within the scope of this invention to use thicker walled tubing.

In use, after the bead closure has been formed on a predetermined length of tubing, the contents to be packaged therein is inserted through the open top, with or without expanding the container depending on the nature of the contents to be packaged therein. The top of the tubing is then closed and sealed in any appropriate manner.

The invention provides a new and improved bead seal which is neat, attractive, uniform, strong, rugged and liquid-proof. The method of producing bead seals is relatively simple to carry out and does not require any expensive or complicated apparatus.

Since it is obvious that various changes and modifications may be made in the above description without departing from the nature or spirit thereof, this invention is not restricted thereto except as set forth in the appended claims.

I claim:

1. A method of sealing one end of a flattened tubing formed of a thermoplastic material to form an end closure, which comprises exposing such end to the zone of action of a flame for a period of time sufficient to melt the thermoplastic without combustion and without substantial carbonization, conducting away excess heat and restricting the melting of the tubing to a length longitudinally of the tubing sufficient to provide an amount of molten thermoplastic which will coalesce and set to form a bead closure upon removal from the zone of action of the flame.

2. A method of sealing one end of a flattened tubing formed of a poly ethylene to form an end closure, which comprises passing a predetermined length of tubing adjacent the end which is to be sealed through the zone of action of a flame at a speed to melt the polyethylene without combustion and without substantial carbonization, conducting away excess heat and restricting the melting of the tubing to said predetermined length thereof, said length of tubing being sufficient to provide an amount of molten polyethylene which will coalesce and form a bead closure upon removal from the zone of action of the flame.

3. A method of sealing one end of a flattened tubing formed of polyethylene to form an end closure, which comprises exposing a length of from about $\frac{1}{16}$" to $\frac{1}{8}$" of tubing adjacent the end which is to be sealed to the zone of action of a flame for a period of time sufficient to melt the polyethylene without combustion and without substantial carbonization, conducting away excess heat and restricting the melting of the tubing to said length of tubing.

4. A method of sealing one end of a flattened tubing formed of polyethylene to form an end closure, which comprises passing a length of from about $\frac{1}{16}$" to $\frac{1}{8}$" of tubing adjacent the end which is to be sealed through the zone of action of a flame at a speed to melt the polyethylene without combustion and without substantial carbonization, conducting away excess heat and restricting the melting of the tubing to said length of tubing.

5. A method of sealing one end of a flattened tubing formed of polyethylene to form an end closure, which comprises gripping a flattened tubing between a pair of heat conducting strips having the front edges thereof in alignment so that the end of the tubing which is to be sealed projects from $\frac{1}{16}$ to $\frac{1}{8}$ of an inch forwardly of said edges and exposing said end of the tubing to the zone of action of a flame for a sufficient time to melt the polyethylene without combustion and without substantial carbonization.

JAMES H. LLOYD, Jr.

REFERENCES CITED

The following references are of record in the file of this patent:

UNITED STATES PATENTS

| Number | Name | Date |
|---|---|---|
| 2,087,209 | Lahey et al. | July 13, 1937 |
| 2,170,364 | Bergstein | Aug. 22, 1939 |
| 2,220,545 | Reinhardt | Nov. 5, 1940 |
| 2,224,017 | Gurwick | Dec. 3, 1940 |
| 2,367,725 | Lindh et al. | Jan. 23, 1945 |
| 2,368,645 | De Sylva | Feb. 6, 1945 |
| 2,380,914 | Billeb | Aug. 7, 1945 |
| 2,407,495 | High et al. | Sept. 10, 1946 |

OTHER REFERENCES

Polyethylene Resins, published by Bakelite Corp., 30 E. 42nd St., New York city, 1944, page 9.